United States Patent
Su et al.

(10) Patent No.: US 12,171,200 B2
(45) Date of Patent: Dec. 24, 2024

(54) CARBON SINK ENHANCEMENT METHOD BASED ON OYSTER-UNDARIA PINNATIFIDA INTEGRATED AQUACULTURE

(71) Applicant: National Marine Environmental Monitoring Center, Dalian (CN)

(72) Inventors: Jie Su, Dalian (CN); Jingfeng Fan, Dalian (CN); Tian Hu, Dalian (CN); Hongxia Ming, Dalian (CN); Kuishuang Shao, Dalian (CN); Tingting Shi, Dalian (CN)

(73) Assignee: National Marine Environmental Monitoring Center, Dalian (CN)

( * ) Notice: Subject to any disclaimer, the term of this patent is extended or adjusted under 35 U.S.C. 154(b) by 0 days.

(21) Appl. No.: 18/586,339

(22) Filed: Feb. 23, 2024

(65) Prior Publication Data

US 2024/0196871 A1  Jun. 20, 2024

(51) Int. Cl.
*A01K 61/54* (2017.01)

(52) U.S. Cl.
CPC .................................. *A01K 61/54* (2017.01)

(58) Field of Classification Search
CPC ........ A01K 61/00; A01K 61/54; A01K 61/50; Y02A 40/81
USPC .................................................. 119/234, 236
See application file for complete search history.

(56) References Cited

FOREIGN PATENT DOCUMENTS

| CN | 106234266 | A |   | 12/2016 |  |
|----|-----------|---|---|---------|--|
| CN | 106538434 | A |   | 3/2017  |  |
| CN | 107125173 | A | * | 9/2017  | A01K 61/54 |
| CN | 112753628 | A | * | 5/2021  | A01K 61/55 |
| CN | 113913297 | A |   | 1/2022  |  |
| CN | 113951191 | A |   | 1/2022  |  |
| CN | 115245138 | A |   | 10/2022 |  |
| CN | 116034923 | A |   | 5/2023  |  |
| JP | 2000157093 | A |  | 6/2000  |  |
| KR | 101921860 | B1 |  | 11/2018 |  |
| KR | 102010722 | B1 | * | 8/2019 | A01K 61/73 |
| TW | 200617163 | A |  | 6/2006  |  |
| WO | 2016129703 | A1 |  | 8/2016 |  |
| WO | 2021079297 | A1 |  | 4/2021 |  |

OTHER PUBLICATIONS

Lintao Tan et al., "Ecological interculture model of oyster and undaria pinnatifida in shallow sea", China Fisheries, May 5, 2019, No. 5, pp. 78-80.

* cited by examiner

*Primary Examiner* — Peter M Poon
*Assistant Examiner* — Danielle A Clerkley

(57) ABSTRACT

A carbon sink enhancement method based on oyster-*Undaria pinnatifida* integrated aquaculture is performed as follows. Oysters with similar size and appearance are selected, washed and evenly spread onto a bottom of an incubator, to which 5-15° C. seawater is added. A rope is fixed on an upper side wall of the incubator. *Undaria pinnatifida* seedlings are spacedly clamped on the rope for spaced hanging culture. A wet weight ratio of the oyster to the *Undaria pinnatifida* seedlings is 6-8:1. The incubator is placed under sunlight for mixed culture, during which the incubator remains closed without water replacement. The oysters or the *Undaria pinnatifida* seedlings are taken out when the oyster reaches a meat yield of 10% or more or a length of the *Undaria pinnatifida* seedlings is larger than 100 cm. Seawater samples are collected to detect water quality parameters for carbon sink assessment.

5 Claims, 5 Drawing Sheets

CARBON SINK ENHANCEMENT METHOD BASED ON OYSTER-UNDARIA PINNATIFIDA INTEGRATED AQUACULTURE

CROSS-REFERENCE TO RELATED APPLICATIONS

This application claims the benefit of priority from Chinese Patent Application No. 202311482035.9, filed on Nov. 9, 2023. The content of the aforementioned application, including any intervening amendments thereto, is incorporated herein by reference in its entirety.

TECHNICAL FIELD

This application relates to marine aquaculture, and more specifically to a carbon sink enhancement method based on oyster-*Undaria pinnatifida* integrated aquaculture.

BACKGROUND

Since the industrial revolution, large amounts of carbon dioxide ($CO_2$) emissions caused by human activities, such as the burning of fossil fuels, lead to an increase in atmospheric $CO_2$ concentration from 280 mg kg$^{-1}$ to about 400 mg kg$^{-1}$, resulting in a series of problems such as sea level rise, reduction of biodiversity, and water pollution, which have posed a serious threat to the survival and health of human beings. Global warming has become a pressing worldwide problem. The ocean is the largest active carbon reservoir on Earth and the largest sink for anthropogenic $CO_2$ release, and it absorbs about 30% of anthropogenic $CO_2$ release every year. The total amount of $CO_2$ emitted by human activities in 2018 is about 11.5 Gt, of which about 2.6 Gt is absorbed by the ocean. The huge carbon absorption capacity of the ocean plays an important role in reducing atmospheric $CO_2$ and slowing down global warming. Carbon sink fisheries are processes and mechanisms that promote the absorption of $CO_2$ from water by aquatic organisms through fishery production activities, and remove $CO_2$ from water by harvesting aquatic organisms or deposit $CO_2$ to the bottom of the water through biological sedimentation. The new low-carbon and green concept of carbon sink fisheries better demonstrates the two functions of aquaculture, namely, food supply and ecological services. Integrated multi-trophic aquaculture (IMTA) is a low-carbon, ecological and efficient aquaculture model, which can improve the ecological environment and increase fishermen's income, as well as artificially increase the bio-carbon sinks, better reflecting the new concept of carbon sink fishery for the sustainable development of low-carbon economy of China.

IMTA is an aquaculture technology that farms aquaculture species from different trophic levels in a single system, and is a way to achieve environmental and economic sustainability. An organic extraction unit (mainly shellfish, which can filter particulate organic matter) and an inorganic extraction unit (mainly macroalgae, which can absorb inorganic nutrient salts) in the IMTA system can absorb organic and inorganic particulate wastes from baitfish and shrimp species, reducing the environmental hazards from aquaculture. Studies show that the IMTA technology increases the production of aquaculture animals and seaweeds while reducing the production of environmental pollutants. IMTA is not a new concept, of which the origin can be traced back thousands of years to ancient civilizations in China and Egypt, where farmers practice a form of agriculture combined with fish farming. The modern concept of IMTA is first developed in the 1970s by Ryther and his colleagues at the Woods Hole Oceanographic Institution, who realize the basic concept of IMTA by combining multi-trophic organisms. Since then, many IMTA aquaculture bases have been established worldwide, mainly in western countries, while Sanggou Bay in China is the largest IMTA aquaculture base in the world. At present, the IMTA mode of marine aquaculture in China includes shell-algae mixed culture, fish-shrimp mixed culture, etc. A large number of practices show that the IMTA aquaculture mode is a better aquaculture mode than monoculture in terms of economic and ecological benefits.

China is the largest seawater shellfish and algae aquaculture production country in the world. The statistical data of China Fisheries Statistical Yearbook shows that in 2021, the seawater shellfish and algae aquaculture production in China is 17.98 million tons, accounting for about 81.3% of the seawater aquaculture production in China, accounting for about ½ of the seawater aquaculture production in the world, which plays an important role in dealing with climate change. According to the study, the total carbon sink of shellfish aquaculture in China in the three years of 2018-2020 is as high as 6.59 million t, equivalent to 870,000 hm$^2$ of compulsory afforestation per year, reflecting the strong carbon sink function of shellfish aquaculture. In addition, the average annual carbon sequestration of both oysters and *Undaria pinnatifida* can rank in the top three, with great potential for carbon sinks. This shows that the integrated shellfish and algae multi-trophic aquaculture model can better reflect the ecological benefits of aquaculture, and the carbon sink function of shellfish and algae plays a certain role, which is a representative development model of aquaculture in the carbon sink fishery. Therefore, it is of great significance to vigorously develop the integrated multi-trophic aquaculture model of marine carbon sink fishery, break through the key technologies to improve the marine aquaculture industry, solve the problems in the existing aquaculture model, carry out the artificial aquaculture of shellfish, algae and other organisms, and actively expand the reform of the ecosystem aquaculture model. This is important for the development of low-carbon economy and the realization of "carbon neutral" goal.

SUMMARY

To solve the technical problems in the prior art, the present disclosure provides a carbon sink enhancement method based on oyster-*Undaria pinnatifida* integrated aquaculture mode.

An objective of the present disclosure is to provide a carbon sink enhancement method based on oyster-*Undaria pinnatifida* integrated aquaculture mode, comprising:
- (S1) selecting a plurality of oysters with similar size and appearance, and removing adherents on shells of the plurality of oysters; washing the plurality of oysters and evenly spreading the plurality of oysters onto a bottom of an incubator, wherein each of the plurality of oysters has a wet weight of 130-140 g; and the plurality of oysters are *Ostrea talienwhanensis* Crosse;
- (S2) feeding 5-15° C. seawater to the incubator; and fixing a rope on an upper side wall of the incubator, wherein a volume of the seawater is 60-75% of that of the incubator;
- (S3) clamping a plurality of *Undaria pinnatifida* seedlings without damage at intervals on the rope for spaced hanging culture; and placing the plurality of *Undaria pinnatifida* seedlings above the plurality of oysters, wherein a wet weight ratio of each of the plurality of oysters to each of the plurality of *Undaria pinnatifida* seedlings is 8:1;

(S4) exposing the incubator to sunlight for mixed culture, during which the incubator remains closed without water replacement; taking out the plurality of oysters or the plurality of *Undaria pinnatifida* seedlings when the plurality of oysters reach a meat yield of more than or equal to 10% or a length of the plurality of *Undaria pinnatifida* seedlings is larger than 100 cm; and collecting a seawater sample to detect water quality parameters for carbon sink assessment, wherein the meat yield is calculated by soft tissue weight/total weight*100%; and (S5) replacing the plurality of oysters or the plurality of *Undaria pinnatifida* seedlings with a new batch of oysters or *Undaria pinnatifida* seedlings; and repeating steps (S1)-(S4) for next round of mixed culture.

In an embodiment, the plurality of oysters are *Ostrea talienwhanensis* Crosses; and an initial length of the plurality of *Undaria pinnatifida* seedlings is 45-55 cm.

In an embodiment, the seawater is sand-filtered natural seawater.

In an embodiment, the wet weight ratio of each of the plurality of oysters to each of the plurality of *Undariapinnatifida* seedlings is 8:1.

In an embodiment, each of the plurality of oysters has a shell height of 3-5 cm, a shell length of 9-11 cm and a shell width of 5-6 cm.

In an embodiment, the water quality parameters comprise salinity, pH, dissolved oxygen, dissolved organic carbon concentration, dissolved inorganic carbon concentration or a combination thereof.

The present disclosure has at least the following beneficial effects compared with the prior art.

In the present disclosure, the non-baiting filter-feeding shellfish and shell thereof grow by filter-feeding particulate organic carbon such as phytoplankton and organic debris in seawater without external feeding, and a large amount of carbon can be removed through harvesting, which has a low negative impact on the environment and significant carbon sink effect.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EMBODIMENTS

Figure 1:
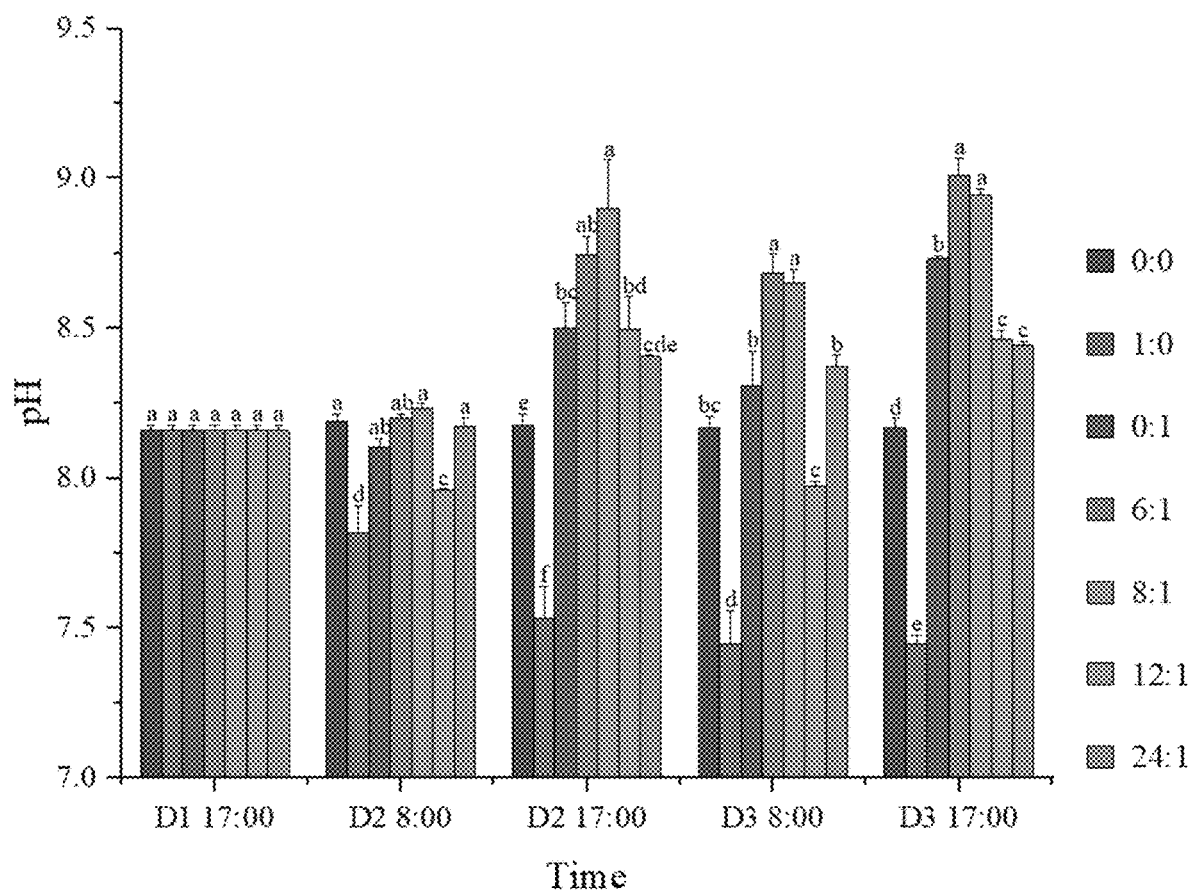
FIG. 1 shows results of change in pH in mixed culture of oysters and *Undaria pinnatifida* with different ratios according to an embodiment of the present disclosure.

Embodiments of the present disclosure will be described with reference to the accompanying drawings below. In the following description, identical modules are indicated using the same attachment markings. In the case of the same attachment markings, their names and functions are also the same. Therefore, their detailed descriptions will not be repeated.

To make the objects, technical solutions and advantages of the present disclosure clearer and more understandable, the present disclosure is described in further detail hereinafter in conjunction with the accompanying drawings and specific embodiments. It should be understood that the specific embodiments described herein are for the purpose of explaining the present disclosure only and do not constitute a limitation of the present disclosure.

The experimental materials of the present disclosure are described as follows.

*Undaria pinnatifida* and *Ostrea talienwhanensis* Crosse are taken from the Tahe Bay farm in Dalian City, and are transported back to the laboratory in a refrigerated truck throughout the whole process. After that, the *Undaria pinnatifida* and *Ostrea talienwhanensis* Crosse are wash with sand-filtered natural seawater to remove the surface adhering sediment, and are temporarily raised in the culture tank. Before the experiment, the visible water droplets on the surface of the *Undaria pinnatifida* and *Ostrea talienwhanensis* Crosse are absorbed with filter paper, and the *Undaria pinnatifida* attached to the *Ostrea talienwhanensis* Crosse is gently brushed off with a brush. After that, the *Undaria pinnatifida* and *Ostrea talienwhanensis* Crosse are weighed.

The present disclosure provides a carbon sink enhancement method based on oyster-*Undaria pinnatifida* integrated aquaculture, which includes the following steps.

(S1) A plurality of oysters with similar size and appearance are selected. Adherents on shells of the plurality of oysters are removed, followed by washing. The plurality of oysters are evenly spread onto a bottom of an incubator, where each of the plurality of oysters has a wet weight of 130-140 g, a shell height of 3-5 cm, a shell length of 9-11 cm and a shell width of 5-6 cm.

(S2) 5-15° C. seawater is fed to the incubator. A rope is fixed on an upper side wall of the incubator, where a volume of the seawater is 60-75% of that of the incubator, and the seawater is sand-filtered natural seawater.

(S3) A plurality of *Undaria pinnatifida* seedlings without damage are clamped on the rope at intervals for spaced hanging culture, and are placing above the plurality of oysters, where a wet weight ratio of each of the plurality of oysters to each of the plurality of *Undaria pinnatifida* seedlings is 6-8:1.

(S4) The incubator is exposed to sunlight for mixed culture, during which the incubator remains closed without water replacement. The plurality of oysters or the plurality of *Undaria pinnatifida* seedlings are taken out when the plurality of oysters reach a meat yield of more than or equal to 10% or a length of the plurality of *Undaria pinnatifida* seedlings is larger than 100 cm. Seawater samples are collected to detect water quality parameters for carbon sink assessment, where the meat yield is calculated by the following formula:

meat yield=soft tissue weight/total weight*100%.

(S5) The plurality of oysters or the plurality of *Undaria pinnatifida* seedlings are replaced with a new batch of oysters or *Undaria pinnatifida* seedlings, and steps (S1)-(S4) are repeated for next round of mixed culture.

In an embodiment, the wet weight ratio of each of the plurality of oysters to each of the plurality of *Undaria pinnatifida* seedlings is 8:1.

In an embodiment, the water quality parameters include salinity, pH, dissolved oxygen, dissolved organic carbon concentration, dissolved inorganic carbon concentration or a combination thereof.

Example 1

This embodiment provides a carbon sink enhancement method based on oyster-*Undaria pinnatifida* integrated aquaculture mode, which includes the following steps.

(S1) Multiple healthy oysters with similar size and appearance were selected. After removing the adherents, the oysters were washed and evenly spread onto a bottom of a 30 L incubator, where the oysters had a wet weight of 137.86±13.35 g, a shell height of 4.11±0.15 cm, a shell length of 10±0.33 cm and a shell width of 5.76±0.18 cm.

(S2) 20 L of 5-15° C. natural seawater treated by sand filtration was fed to the incubator. A rope was fixed on a side wall corresponding to an upper portion of the incubator.

the leaves of *Undaria pinnatifida* continuously fall off, forming organic debris to provide bait for oysters. The oysters fed on single-cell algae and organic debris in seawater, providing a constant supply of bait for oysters to grow, improving the transparency of the water body, which was conducive to the photosynthesis and growth of *Undaria pinnatifida*. The *Undaria pinnatifida* absorbed carbon dioxide to photosynthesize to produce oxygen, while the oysters consumed oxygen to produce carbon dioxide, which was physiologically complementary to the growth of the two in the same environment and promotes the growth of each other.

Example 2

Optimization experiments regarding the wet weight ratio of the oyster to the *Undaria pinnatifida* seedling were described as follows.

Different wet weight ratios, i.e., a blank group and experimental groups (single oyster group, single *Undaria pinnatifida* group, oyster-*Undaria pinnatifida* mixing group) were set. The wet weight ratios of the oyster to the *Undaria pinnatifida* in the experimental groups were 1:0, 0:1, 6:1, 8:1, 12:1, and 24:1, respectively labeled as groups A-F. The actual wet weights of the oyster and the *Undaria pinnatifida* in each group under three different wet weight ratios were listed in the following Table 1.

TABLE 1

Actual wet weights (g) of the oyster and the *Undaria pinnatifida* under different wet weight ratios

| Different wet weight ratios | A | | B | | C | | D | | E | | F | |
|---|---|---|---|---|---|---|---|---|---|---|---|---|
| | Oyster | *Undaria pinnatifida* | Oyster | *Undaria pinnatifida* | Oyster | *Undaria pinnatifida* | Oyster | *Undaria pinnatifida* | Oyster | *Undaria pinnatifida* | Oyster | *Undaria pinnatifida* |
| 1 | 623.2 | 0.0 | 0.0 | 50.2 | 616.2 | 103.2 | 587.6 | 74.8 | 609.5 | 49.2 | 618.6 | 25.7 |
| 2 | 578.4 | 0.0 | 0.0 | 49.7 | 622.1 | 104.8 | 600.2 | 75.7 | 595.6 | 50.4 | 602.4 | 25.4 |
| 3 | 603.7 | 0.0 | 0.0 | 50.6 | 584.6 | 100.5 | 597.5 | 74.7 | 575.1 | 50.9 | 619.0 | 26.3 |
| Average weight | 601.8 | 0.0 | 0.0 | 50.2 | 607.6 | 102.8 | 595.1 | 75.1 | 593.4 | 50.2 | 613.3 | 25.8 |
| Wet weight ratio of the oyster to the *Undaria pinnatifida* | 1:0 | | 0:1 | | 6:1 | | 8:1 | | 12:1 | | 24:1 | |

(S3) Multiple *Undaria pinnatifida* seedlings without damage were clamped at intervals on the rope for spaced hanging culture, and were placed above the oysters, where the *Undaria pinnatifida* seedlings had a wet weight of 12.85±1.80 g, a length of 51.25±3.16 cm and a width of 15.04±1.50 cm; and a wet weight ratio of the oyster to the *Undaria pinnatifida* seedling was 6-8:1.

(S4) The incubator was placed under sunlight for mixed culture, during which the incubator remained closed without water replacement. The oysters or the *Undaria pinnatifida* seedlings were taken out after the meat yield (soft tissue weight/total weight) of the oysters was more than or equal to 10% or the *Undaria pinnatifida* seedlings were longer than 100 cm. Seawater samples were collected to detect water quality parameters for carbon sink assessment.

(S5) The oysters or the *Undaria pinnatifida* seedlings were replaced with a new batch of oysters or *Undaria pinnatifida* seedlings, and steps (S1)-(S4) were repeated for the next round of mixed culture.

The principles of the method provided herein were described below. In the process of experimental cultivation, Sample Collection and Sample Pre-Treatment Samples were cultured according to the method of the present disclosure, and were collected at 17:00 on the first day, and at 8:00 and 17:00 on the second and third days, respectively. Each collection lasted for 1 h. Water quality parameters such as seawater temperature (Temp), salinity, pH, dissolved oxygen (DO), dissolved organic carbon (DOC) concentration and dissolved inorganic carbon (DIC) concentration were determined at the sampling site by using a portable multi-parameter water quality meter (US YSI 556MPS). 60 ml of water samples were collected into 60 ml borosilicate brown bottles for DIC determination, 125 ml of water samples were collected into 125 ml white polyethylene bottles for total alkalinity (TA) determination, treated with 100 μL of saturated $HgCl_2$ to inhibit microbial activity, and stored at 4° C. until analyzed. 40 ml of water samples were filtered through 0.22 μm GF/F needle filters (Millex-GP) and fed to 40 ml borosilicate brown bottles (a muffle furnace was pre-combusted at 450° C. for 5 h) for DOC determination, and subsequently stored at −20° C. All bottles for collection were washed with 2 mol/L hydrochloric acid for 12 h.

Sample Processing and Analysis

TA was determined using an AS-ALK2 total alkalinity analyser (Apollo SciTech). DIC was determined using an AS-D1 dissolved inorganic carbon analyser (Apollo SciTech). DOC was determined using a total organic carbon analyser (TOC-L CPH). Carbonate systems, such as $HCO_3^-$, $CO_3^{2-}$, $CO_2$ and $pCO_2$ were calculated according to DIC, TA, temperature, and salinity data using the CO2sys_v2.2xls software.

Data Analysis

Data were organized using EXCEL 2016, and all experimental data were expressed by mean±standard error (Mean±SE, n≥3), and were analyzed using SPSS 25. One-way ANOVA was used for within-group analyses, and the LSD test was used, with P<0.05 as a significant difference. Plots were made using Origin 2021.

Results Analysis (1) pH pH changes were shown in FIG. 1, where the change in pH showed a trend of high in day and low in night. The blank group showed an up and down trend with little change. The single oyster group showed a gradual downward trend. At the end of the experiment, the pH was as low as 7.45, showing a significant difference (p<0.05). A higher percentage of macroalgae resulted in a greater pH, which was favourable to contribute to the reduction of ocean acidification. At the end of the experiment, the treatment groups with different ratios of the oyster to the *Undaria pinnatifida* showed different degrees of increase, where the highest was the ratio of 6:1 with pH as high as 9.01, and except for the ratio of 8:1, the rest ratios had a significant difference in pH (p<0.05).

Figure 2:
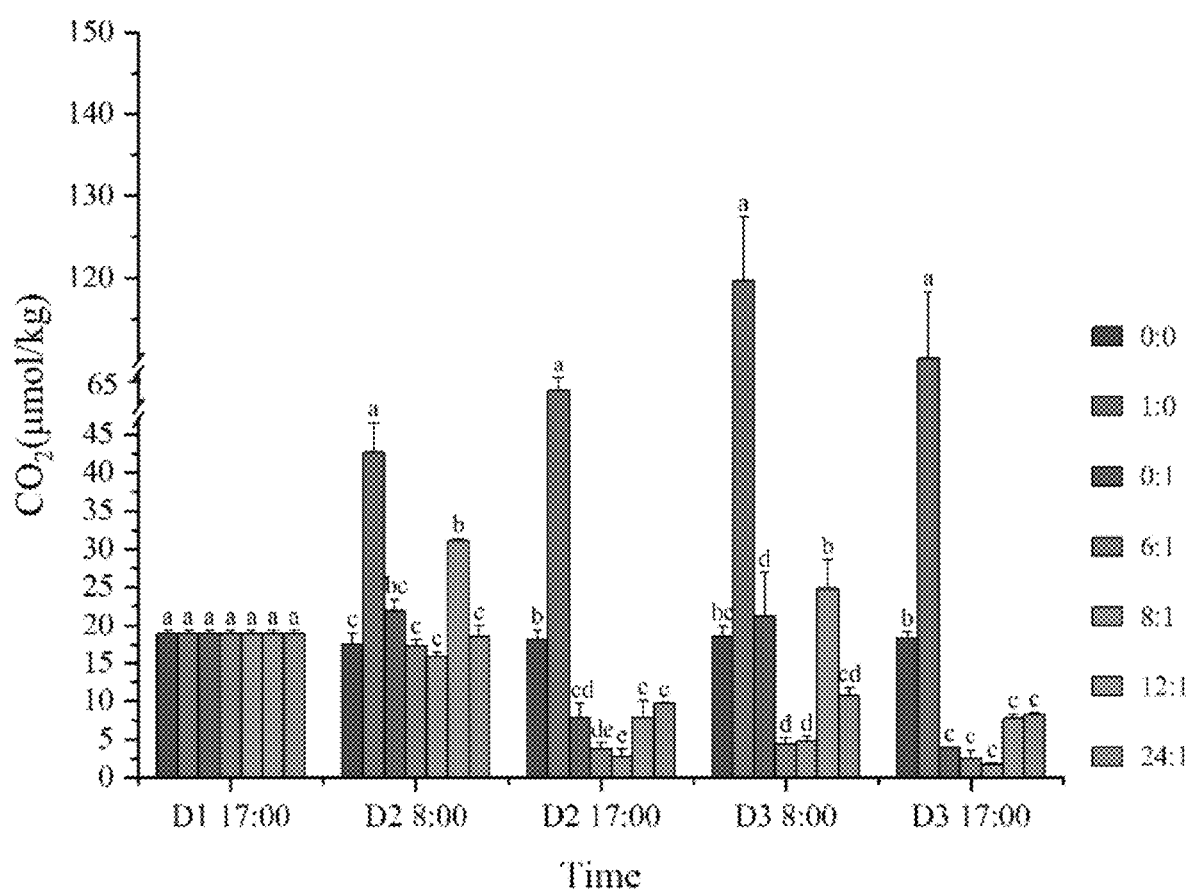
FIG. 2 shows results of change in $CO_2$ concentration in the mixed culture of oysters and *Undaria pinnatifida* with different ratios according to an embodiment of the present disclosure.

(2) $CO_2$ Concentration $CO_2$ concentration varied as shown in FIG. 2. The single *Undaria pinnatifida* group and the oyster-*Undaria pinnatifida* mixing groups with different oyster-*Undaria pinnatifida* ratios showed a trend of lower $CO_2$ concentration in the daytime and higher $CO_2$ concentration at night, with an overall decreasing trend. The blank group showed no significant change in $CO_2$ concentration. The single oyster group showed a trend of higher growth of CO2 concentration, and oysters showed a higher growth trend of $CO_2$ concentration through their own metabolism and the growth of the shell (calcification), which was as high as 110.17 μmol/kg at 3 d, showing a significant difference (p<0.05). At the end of the experiment, the single *Undaria pinnatifida* group, and the oyster-*Undaria pinnatifida* mixing groups with oyster-*Undaria pinnatifida* ratios of 6:1 and 8:1 showed a significant decrease in $CO_2$ concentration, with a significant carbon sink effect, and there was no significant difference between the three groups (p>0.05).

(3) DIC Changes

Figure 3:
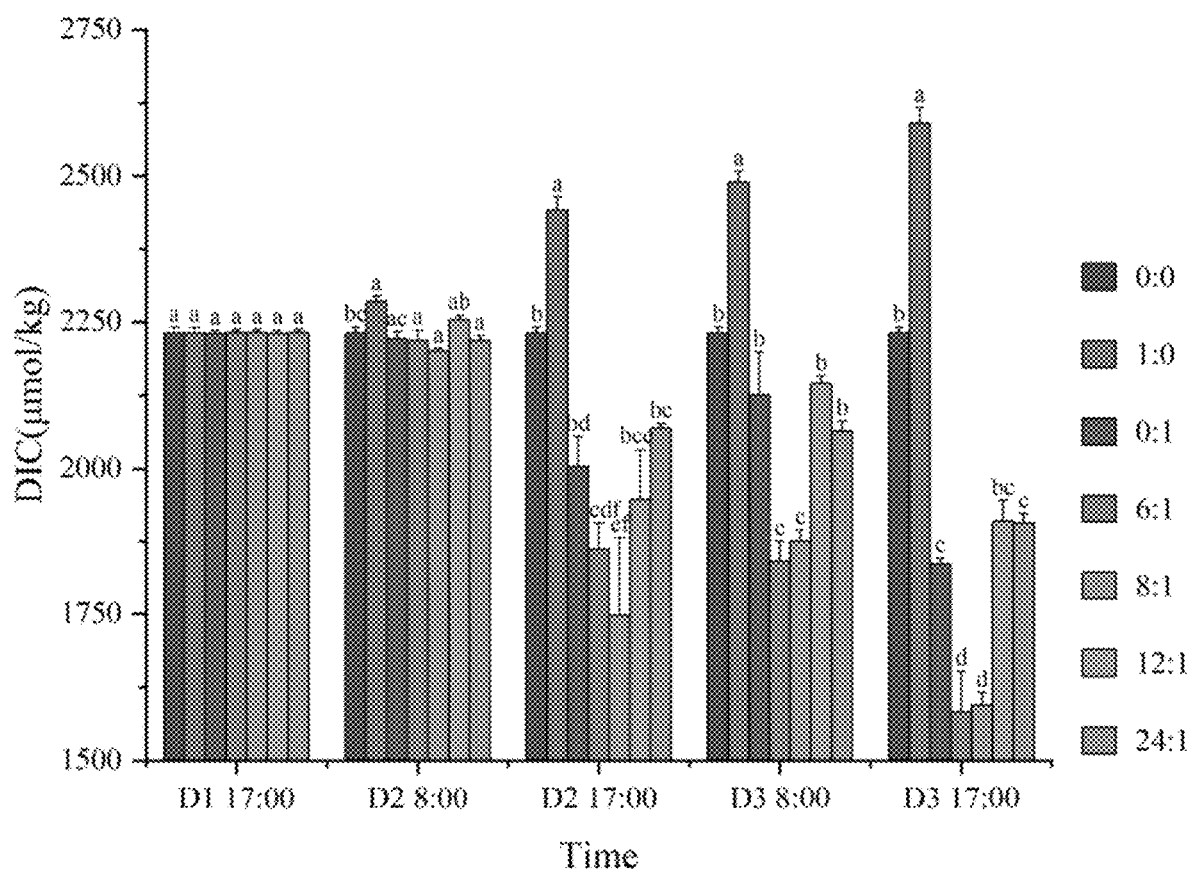
FIG. 3 shows results of change in dissolved inorganic carbon (DIC) concentration in the mixed culture of oysters and *Undaria pinnatifida* with different ratios according to an embodiment of the present disclosure.

DIC changes were shown in FIG. 3, where the blank group showed an overall parallel trend; the single oyster group showed an increasing trend, up to 2347.52 mol/kg at 17:00 of 3 d; the single oyster group and the oyster-*Undaria pinnatifida* mixing groups showed a decreasing trend during the day, and an increasing trend at night, with an overall decreasing trend, where the groups with oyster-*Undaria pinnatifida* ratios of 6:1 and 8:1 showed significant decrease in DIC, with DIC concentrations of 1583.51 μmol/kg and 1594.10 μmol/kg, respectively, at the end of the experiment. There was no significant difference between the two groups (p>0.05), but compared with other groups, there was a significant difference (p<0.05). The concentration of DIC affected the photosynthesis of macroalgae and their own growth. It significantly inhibited the photosynthesis of macroalgae when the DIC was low. At the end of the experiment, the DIC concentration was significantly reduced.

(4) DOC Changes

Figure 4:
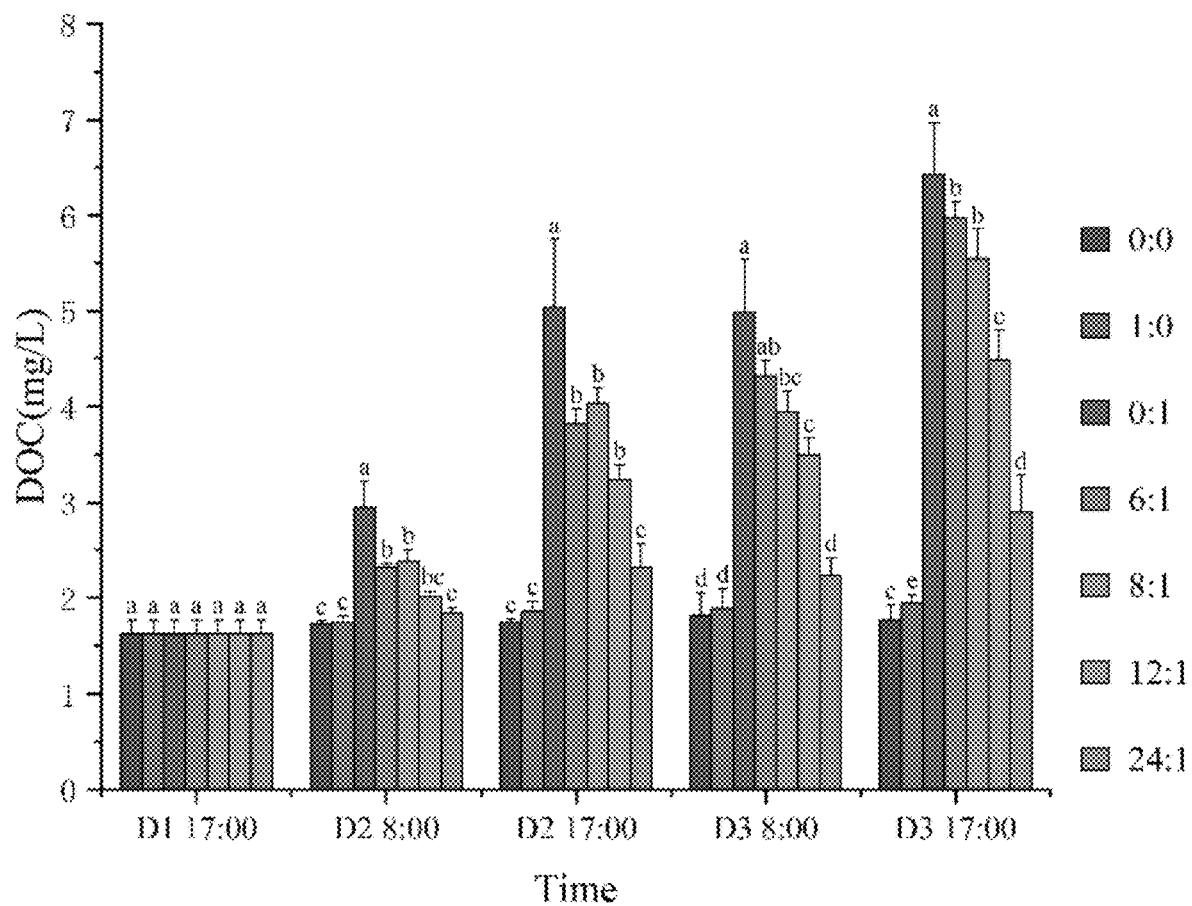
FIG. 4 shows results of change in dissolved organic carbon (DOC) concentration in the mixed culture of oysters and *Undaria pinnatifida* with different ratios according to an embodiment of the present disclosure.

The changes in DOC of oyster-*Undaria pinnatifida* mixing groups were shown in FIG. 4. The results showed that the changes in DOC concentration in all the experimental groups showed different degrees of increase. The blank group showed an up and down tendency. The single oyster group showed a stable upward tendency with a DOC concentration from 1.64 mg/L at the early stage of the experiment to 1.94 mg/L, and the growth rate, excluding the degradation of DOC itself, was 18.3%. The single *Undaria pinnatifida* group and the oyster-*Undaria pinnatifida* mixing group with a oyster-to-*Undaria pinnatifida* ratio of 6:1 showed extremely high growth rates, as high as 6.94 mg/L and 5.98 mg/L, respectively, at the end of the experiment, with significant differences (p<0.05). The growth rates in the blank group and the single oyster group were lower, which could be attributed to the lower rate of DOC release from oysters compared to *Undaria pinnatifida* and the degradation of DOC per se in the water.

(5) $pCO_2$ Changes

Figure 5:
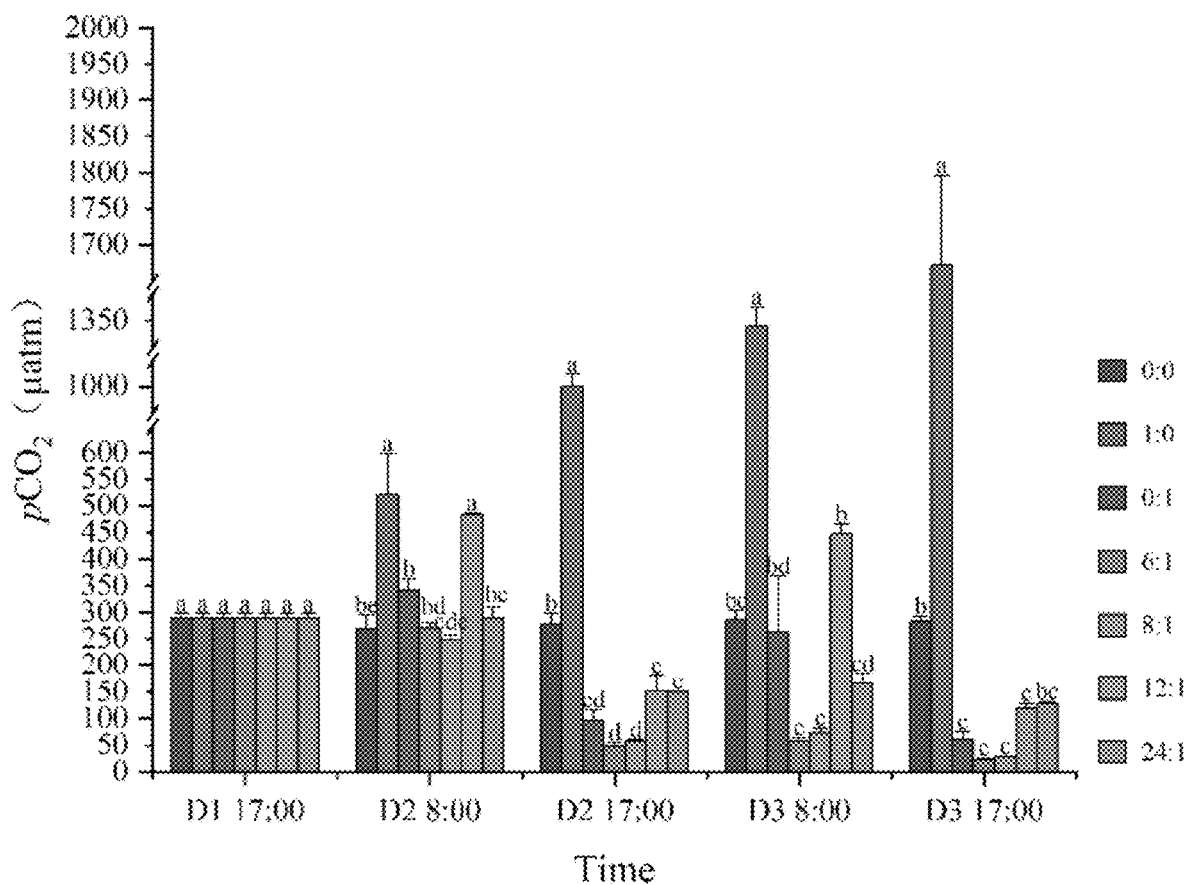
FIG. 5 shows results of change in partial pressure of $CO_2$ ($pCO_2$) in the mixed culture of oysters and *Undaria pinnatifida* with different ratios according to an embodiment of the present disclosure.

Changes in $pCO_2$ of oyster-*Undaria pinnatifida* mixing groups were shown in FIG. 5, and the results show that the changes in $pCO_2$ were very similar to the observed changes in $CO_2$ concentration. $pCO_2$ also showed diurnal fluctuations, but in this case, it was increased at the night and decreased during the day, with an overall trend of decreasing. The blank group showed continuous fluctuations up and down. Higher $pCO_2$ concentrations were observed in the groups with a higher proportion of oysters. The $pCO_2$ of the single oyster group continued to increase, reaching as high as 1,672.59 atm at the end of the experiment, exhibiting a very strong $CO_2$ source, and showing a significant difference (p<0.05). At the end of the experiment, it was found that the group with an oyster-to-*Undaria pinnatifida* ratio of 6:1 and 8:1 showed significant decreases in $pCO_2$, and exhibited extremely strong $CO_2$ sinks when $pCO_2$ was as low as 22.49 atm and 28.23 atm, with no significant difference between the two groups (p<0.05). Overall, the $CO_2$ carbon sink in the water was more pronounced when the proportion of *Undaria pinnatifida* was higher.

In this example, the pH and $CO_2$ concentration changed in opposite trends. The oyster produced $CO_2$ through respiration during the day and night, which lowered the pH and raised the $CO_2$ concentration in the seawater, while the *Undaria pinnatifida* absorbed $CO_2$ through photosynthesis, which lowered the $CO_2$ concentration in the seawater and increased the pH, explaining the phenomenon that the pH was high during the day and low at the night, and the $CO_2$ concentration was low during the day and high at the night. The oyster released $CO_2$ through calcification and respiration. At the end of the experiment, the pH of the single oyster group dropped to 7.45, which was on the verge of survival. It has been shown that when the pH in the water was 7.3, the calcification rate of the shellfish was close to 0, and the shellfish could not be able to synthesize shells, which was detrimental to their survival or carbon sinks. In addition, the $CO_2$ concentration in the single oyster group at 8:00 of D3 was lower than that at 17:00 of D3, which might be a strategy of the oyster to cope with the change of pH of the seawater and adapt to the acidification of the seawater, resulting in a decrease in the respiration rate of the oyster. FIG. 1 showed that different mixing ratios of the oyster to the *Undaria pinnatifida* caused different degrees of pH increase, indicating that macroalgae played an important role in mitigating ocean acidification, and the appropriate ratio of the oyster to the *Undaria pinnatifida* could reduce $CO_2$ concentration and form carbon sinks to resist ocean acidification. In addition, Ricart et al. showed that macroalgae culture can increase the rate of calcification of oyster shells, which led to an increase in the growth rate by 40%, and increased the rate of carbon sequestration. Therefore, macroalgae farming could theoretically counteract the effects of carbon dioxide from shellfish respiration and calcification on the pH and DO of the ocean. The larger the proportion of *Undaria pinnatifida* in the oyster-*Undaria pinnatifida* mixed culture, the more obvious the effect of $CO_2$ absorption, which indicated that the photosynthetic rate of the *Undaria pinnatifida* was greater than the respiration rate of the oyster. This example also verified this point. At the end of the experiment, the $CO_2$ concentration of the groups with an oyster-to-*Undaria pinnatifida* ratio of 6:1 and 8:1 was significantly lower than that of the other groups, and the $CO_2$ concentration in the water was better absorbed, showing a better effect on carbon sinks.

The results showed that the DIC produced by the oyster through respiration was significantly greater than the DIC consumed in calcification during this process, creating an overall increase in DIC, which was similar to the conclusion reached by Liu et al. Thus, respiration in bivalves might contribute to the accumulation and release of DIC in the water. It has been shown that although $CO_2$ emitted by shellfish respiration did not affect the TA in seawater, the calcification process of shellfish led to a decrease in TA of the seawater, thus limiting the ability of seawater to absorb $CO_2$ and affecting the carbonate balance. In this experiment, the DIC of the groups with different oyster-to-*Undaria pinnatifida* ratios were reduced to different degrees at the end of the experiment, and the DIC was significantly reduced when the oyster-to-*Undaria pinnatifida* ratios were 6:1 and 8:1 ($p<0.05$). This showed that although culturing the algae in the seawater with a relatively low DIC concentration could significantly promote the uptake of DIC by the algae, an over-low DIC concentration would affect the photosynthetic rate and growth rate of the algae. FIG. 4 showed that the DO releases of the oyster-*Undaria pinnatifida* ratios of 6:1 and 8:1 were very similar, even the oyster-to-*Undaria pinnatifida* ratio of 8:1 was slightly higher. In addition, similarly, $CO_2$ concentration of the oyster-to-*Undaria pinnatifida* ratio of 8:1 was slightly lower than that of 6:1, which was most likely due to the fact that the DIC concentration in the water dropped to a very low level in the late stage of the experiment, suppressing photosynthesis of the algae, thereby decreasing the rate of $O_2$ release, the rate of carbon dioxide uptake and the rate of algal growth. The present disclosure verified this point, which was also similar to the study of Han et al. As the experimental water was small and completely closed, and was inevitably different from large-scale shellfish aquaculture, there was different needs for shellfish-to-algae ratios for different environmental benefits. If the demand for a good carbon sink benefit, the shellfish-to-algae ratio of 6:1 was a good choice. If it was required to take the carbon sink benefit, economic benefit and environmental benefit into consideration at the same time, the shellfish-to-algae ratio of 8:1 was a good choice.

Macroalgae and shellfish released DOC into the water during growth. At the end of the experiment, all treatment groups were significantly higher than the blank group with a significant difference ($p<0.05$). The results of the present application showed that DOC released by the macroalgae was significantly higher than that released by the shellfish. Some studies have shown that DOC released by shellfish aquaculture could be reused quickly, and therefore might not be easily stored in seawater. In addition, studies showed that much of the DOC released in the water would be degraded back into the water at the beginning of the release. The oysters themselves release less DOC, combined with the degraded DOC, resulting in even less DOC being detected. The blank group showed a up and down fluctuation trend, which might be due to DOC release by some zooplankton and organic debris in the seawater through microbial decomposition into the water. The unstable DOC released by macroalgae and shellfish would be converted into stable inert organic carbon (RDOC) through microbial carbon sequestration, and stored in the deep sea for a long time, so that the organic carbon produced by shellfish and algae would exert carbon sink effect in the form of dissolved organic carbon. The higher the DOC concentration, the higher the amount of converted RDOC. At the end of the experiment, the DOC concentrations of the shellfish-to-algae ratios of 12:1 and 24:1 were significantly ($p<0.05$) lower than those of 6:1 and 8:1. Therefore, so the shellfish-to-algae ratios of 12:1 and 24:1 were excluded.

Example 3

Shellfish-algae combination optimization experiments were described below.

In the process of integrated culture of shellfish and algae, the shellfish and the algae achieve mutual promotion in respiration, growth and metabolism while each exercised its carbon sequestration function. Both the culture efficiency and environmental protection efficiency were higher than that of monoculture. However, to create the strongest net carbon sink without any negative impact on the environment, it was necessary to determine the appropriate ratio of shellfish to algae. In this example, with reference to relevant papers and other references in the art, various shellfishes were used herein, i.e., *Ostrea talienwhanensis* Crosse, *Crassostrea gigas*, *Azumapecten farreri*, *Mytilus coruscus*, and *Crassostrea angulata*, and various algae were selected herein, i.e., *Undaria pinnatifida*, *Gracilaria lemaneiformis*, *Laminaria japonica*, and *Sargassum hemiphyllum*. The integrated culture of shellfish and algae was conducted under different wet weight ratios of shellfish to algae and different shellfish-algae combinations, and the $CO_2$ removal rate was determined. The effect of carbon sinks with different shellfish-to-algae ratios was assessed through the $CO_2$ removal rate, and the results were shown in Table 2.

TABLE 2

Comparison of carbon sink effect under different shellfish-algae mixing culture modes.

| Shellfish | Algae | Wet weight ratio of shellfish to algae | Removal rate of $CO_2$ |
|---|---|---|---|
| *Ostrea talienwhanensis* Crosse | *Undaria pinnatifida* | 8:1 | 91.33% |
| *Ostrea talienwhanensis* Crosse | *Undaria pinnatifida* | 6:1 | 86.70% |
| *Crassostrea gigas* | *Undaria pinnatifida* | 6:1 | 75.36% |
| *Azumapecten farreri* | *Gracilaria lemaneiformis* | 1:0.96 | 5.94% |
| *Crassostrea angulata* | *Gracilaria lemaneiformis* | 4:1 | 73.75% |
| *Ostrea* | *Gracilaria* | 6:1 | 69.36% |

TABLE 2-continued

Comparison of carbon sink effect under different shellfish-algae mixing culture modes.

| Shellfish | Algae | Wet weight ratio of shellfish to algae | Removal rate of $CO_2$ |
|---|---|---|---|
| talienwhanensis Crosse | lemaneiformis | | |
| Mytilus coruscus | Gracilaria lemaneiformis | 8:1 | 52.36% |
| Crassostrea gigas | Laminaria japonica | 8:3 | 72.08% |
| Crassostrea angulata | Sargassum hemiphyllum | 1:1 | 50.00% |
| Crassostrea gigas | Laminaria japonica | 6:3 | 37.01% |

The results showed that under the combination of *Ostrea talienwhanensis* Crosse and *Undaria pinnatifida*, when the shellfish-to-algae ratio was 6:1 and 8:1, it presented higher values in pH and DOC, which could absorb $CO_2$ better, and showed lower values in $pCO_2$ and $CO_2$ concentration, which had a significant carbon sink effect. When the shellfish-to-algae ratio was 8:1, the $CO_2$ removal rate in seawater was about 91.33%, and the highest $CO_2$ removal rate could be 91.33%. It was clearly concluded that the integrated culture of *Ostrea talienwhanensis* Crosse and *Undaria pinnatifida* with ratios of 6:1 and 8:1 had the best culture results, lower negative environmental impacts and significant carbon sink effects.

It should be understood that the aforementioned steps can be reordered, added or deleted. For example, the steps disclosed in the present disclosure may be performed in parallel, sequentially, or in a different order, as long as the desired results of the technical solution of the present disclosure can be achieved, which is not limited herein.

The above embodiments do not constitute a limitation on the scope of the present disclosure. It should be understood by those skilled in the art that various modifications, combinations, sub-combinations and substitutions may be made according to design requirements and other factors. Any modifications, equivalent substitutions and improvements made within the spirit and principles of the present disclosure shall be included in the scope the present disclosure defined by the appended claims.

What is claimed is:

1. A carbon sink enhancement method based on oyster-*Undaria pinnatifida* integrated aquaculture, comprising:

(S1) selecting a plurality of oysters with similar size and appearance, and removing adherents on shells of the plurality of oysters; washing the plurality of oysters and evenly spreading the plurality of oysters onto a bottom of an incubator, wherein each of the plurality of oysters has a wet weight of 130-140 g; and the plurality of oysters are *Ostrea talienwhanensis* Crosse;

(S2) feeding 5-15° C. seawater to the incubator; and fixing a rope on an upper side wall of the incubator, wherein a volume of the seawater is 60-75% of that of the incubator;

(S3) clamping a plurality of *Undaria pinnatifida* seedlings without damage at intervals on the rope for spaced hanging culture; and placing the plurality of *Undaria pinnatifida* seedlings above the plurality of oysters, wherein a wet weight ratio of each of the plurality of oysters to each of the plurality of *Undaria pinnatifida* seedlings is 8:1;

(S4) exposing the incubator to sunlight for mixed culture, during which the incubator remains closed without water replacement; taking out the plurality of oysters or the plurality of *Undaria pinnatifida* seedlings when the plurality of oysters reach a meat yield of more than or equal to 10% or a length of the plurality of *Undaria pinnatifida* seedlings is larger than 100 cm; and collecting a seawater sample to detect water quality parameters for carbon sink assessment, wherein the meat yield is calculated by soft tissue weight/total weight*100%; and (S5) replacing the plurality of oysters or the plurality of *Undaria pinnatifida* seedlings with a new batch of oysters or *Undaria pinnatifida* seedlings; and repeating steps (S1)-(S4) for next round of mixed culture.

2. The carbon sink enhancement method of claim 1, wherein an initial length of the plurality of *Undaria pinnatifida* seedlings is 45-55 cm.

3. The carbon sink enhancement method of claim 2, wherein the seawater is sand-filtered natural seawater.

4. The carbon sink enhancement method of claim 3, wherein each of the plurality of oysters has a shell height of 3-5 cm, a shell length of 9-11 cm and a shell width of 5-6 cm.

5. The carbon sink enhancement method of claim 4, wherein the water quality parameters comprise salinity, pH, dissolved oxygen, dissolved organic carbon concentration, dissolved inorganic carbon concentration or a combination thereof.

\* \* \* \* \*